US011247612B2

(12) United States Patent
Maat et al.

(10) Patent No.: US 11,247,612 B2
(45) Date of Patent: Feb. 15, 2022

(54) ADJUSTMENT INSTRUMENT AND A METHOD

(71) Applicant: MCi (Mirror Controls International) NETHERLANDS B.V., Woerden (NL)

(72) Inventors: Bastiaan Bartjan Maat, Groot-Ammers (NL); Paulus Gerardus Maria Van Stiphout, Woerden (NL); François Roderik Henri Bouaziz, Rotterdam (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 16/610,218

(22) PCT Filed: May 3, 2018

(86) PCT No.: PCT/NL2018/050292
§ 371 (c)(1),
(2) Date: Nov. 1, 2019

(87) PCT Pub. No.: WO2018/203750
PCT Pub. Date: Nov. 8, 2018

(65) Prior Publication Data
US 2020/0055456 A1    Feb. 20, 2020

(30) Foreign Application Priority Data
May 3, 2017   (NL) ...................................... 2018838

(51) Int. Cl.
*B60R 1/072*    (2006.01)
*B60R 1/076*    (2006.01)

(52) U.S. Cl.
CPC .............. *B60R 1/072* (2013.01); *B60R 1/076* (2013.01)

(58) Field of Classification Search
CPC ....... B60R 1/072; B60R 1/076; B60R 1/0617; B60R 1/074
(Continued)

(56) References Cited
U.S. PATENT DOCUMENTS 4,789,232 A * 12/1988 Urbanek ................. B60R 1/076
248/475.1
5,867,328 A *  2/1999 Stapp ...................... B60R 1/074
359/841

(Continued)

*Primary Examiner* — Christopher Garft
*Assistant Examiner* — Michael McDuffie
(74) *Attorney, Agent, or Firm* — Volpe Koenig

(57) ABSTRACT

The invention relates to an adjusting instrument for an exterior mirror unit of a vehicle, including a support unit and a housing unit pivotable in a circumferential direction between a plurality of positions relative to the support unit. Furthermore, the adjusting instrument includes a breakable rotation-locked coupling unit for coupling of the housing unit to the support unit. The coupling unit comprises a plural number N of parallel disposed couplings where each coupling has two mutually opposed coupling faces, pressed against each other under spring action and mutually displaceable in the circumferential direction. The coupling faces have a periodic cam pattern engaging in each other, wherein the two coupling faces are mutually breakably rotation-locked and wherein only a limited number M of couplings is in engagement at the same time, with M being less than N.

22 Claims, 4 Drawing Sheets

(58) Field of Classification Search
USPC .... 248/544, 548, 549, 466, 475.1, 476, 477, 248/479, 288.11, 289.11, 188.3; 359/841, 359/872, 877
See application file for complete search history.

(56) References Cited

U.S. PATENT DOCUMENTS

| | | | | |
|---|---|---|---|---|
| 6,022,113 | A * | 2/2000 | Stolpe | B60R 1/074 |
| | | | | 248/479 |
| 6,130,514 | A * | 10/2000 | Oesterholt | B60R 1/074 |
| | | | | 248/479 |
| 6,283,863 | B1 | 9/2001 | Lang et al. | |
| 6,286,968 | B1 * | 9/2001 | Sailer | B60R 1/0617 |
| | | | | 248/478 |
| 6,695,118 | B2 * | 2/2004 | Kurita | B60R 1/074 |
| | | | | 192/223.2 |
| 7,334,925 | B2 * | 2/2008 | Pastrick | B60Q 1/2665 |
| | | | | 248/479 |
| 7,735,196 | B2 * | 6/2010 | Centmayer | B60R 1/0617 |
| | | | | 16/334 |
| 8,336,845 | B1 | 12/2012 | Courbon | |
| 2002/0125099 | A1 * | 9/2002 | Kurita | F16D 41/105 |
| | | | | 192/223.2 |
| 2007/0035862 | A1 * | 2/2007 | Brouwer | B60R 1/074 |
| | | | | 359/841 |
| 2009/0303625 | A1 * | 12/2009 | van Stiphout | B60R 1/0617 |
| | | | | 359/841 |
| 2013/0010379 | A1 * | 1/2013 | Sakata | B60R 1/076 |
| | | | | 359/841 |
| 2013/0321941 | A1 * | 12/2013 | van Stiphout | B60R 1/06 |
| | | | | 359/877 |
| 2014/0211333 | A1 * | 7/2014 | Lang | F16D 28/00 |
| | | | | 359/844 |
| 2015/0097955 | A1 * | 4/2015 | De Wind | B60R 1/07 |
| | | | | 348/148 |
| 2015/0224930 | A1 * | 8/2015 | Foote | B60R 1/076 |
| | | | | 359/872 |
| 2015/0366627 | A1 * | 12/2015 | Oginski | A61B 90/50 |
| | | | | 248/288.11 |
| 2018/0345862 | A1 * | 12/2018 | van Stiphout | B60R 1/074 |
| 2018/0345863 | A1 * | 12/2018 | Bouaziz | G02B 7/182 |
| 2020/0298762 | A1 * | 9/2020 | Ichimura | B60S 1/56 |

* cited by examiner vervaardigen van een verstelinstrument

ADJUSTMENT INSTRUMENT AND A METHOD

CROSS REFERENCE TO RELATED APPLICATIONS

This application is a 35 USC § 371 National Stage application of International Patent Application No. PCT/NL2018/050292, which was filed May 3, 2018, entitled "An Adjustment Instrument and a Method" and Netherlands Patent Application No. 2018838, which was filed May 3, 2017, and are incorporated herein by reference as if fully set forth.

This invention relates to an adjusting instrument for an exterior mirror unit for a vehicle.

Adjusting instruments for an exterior mirror unit are generally known and are frequently applied to vehicles, for example cars. Such an adjusting instrument usually comprises a housing which is pivotably adjustable between a park position, a drive position and an overfold position. In the park position the exterior mirror unit is directed substantially along the vehicle with a mirror side facing the vehicle. In the drive position the exterior mirror unit is directed substantially transversely to the vehicle. In the overfold position the exterior mirror unit is directed substantially along the vehicle with the mirror side facing away from the vehicle. In case of an impact such as a collision, the exterior mirror unit can be moved towards the overfold position.

Adjustment of the exterior mirror unit from the park position to the drive position and vice versa may be done electrically or manually.

The above-mentioned adjusting instrument normally includes a support unit which can be mounted on the vehicle, and a housing unit, pivotable in a circumferential direction between a plurality of positions relative to the support unit, on which the exterior mirror unit can be attached. Also, the adjusting instrument includes a rotation-locked coupling unit for coupling the housing unit to the support unit. The coupling unit is breakable in order to allow an adjustment of the exterior mirror unit to the overfold position in case of impact such as a collision as mentioned above.

The coupling unit is for instance implemented by coupling of mutually rotatable elements via a cam connection, such that during normal operating conditions the cam connection, and hence also the rotational locking, is maintained, whereas upon the occurrence of an extreme force, the cam connection decouples. A drawback of the use of a cam connection is that at decoupling, the distance between the housing unit and the support unit does not remain the same but increases, which may be undesired. In addition, with manual adjustment of the exterior mirror unit, the resolution is relatively large. Moreover, the cam connection is susceptible to play.

It is noted that the American patent publication US 2007/0035862 of the same inventor describes a hinge actuator which is provided with such a cam connection.

Also, adjusting instruments are known where the coupling unit is implemented as a friction coupling. However, friction couplings have relatively many components and are relatively costly. An object of the invention is to provide an adjusting instrument in which the above-mentioned disadvantages are counteracted. Thus, an object of the invention is to provide a relatively inexpensive adjusting instrument that is relatively unsusceptible to play. To this end, the invention provides an adjusting instrument for an exterior mirror unit for a vehicle, comprising a support unit and a housing unit pivotable in a circumferential direction between a plurality of positions relative to the support unit, furthermore comprising a breakable rotation-locked coupling unit for coupling of the housing unit to the support unit, wherein the coupling unit comprises a plural number N of parallel disposed couplings where each coupling has two mutually opposed coupling faces, pressed against each other under spring action and mutually displaceable in the circumferential direction, which are provided with a periodic cam pattern engaging in each other, wherein the two coupling faces are mutually breakably rotation-locked and wherein only a limited number M of couplings is in engagement at the same time, with M being less than N.

By the use of a plural number N of parallel disposed couplings with coupling faces that engage in each other, but only a limited number M at the same time, hence not all N couplings at the same time, the sensitivity to play is small while the number of components remains relatively limited so that the adjusting instrument can, in principle, be manufactured relatively inexpensively. N and M are natural numbers, with N being greater than one, and M being less than N.

As not all coupling faces engage at the same time, the resolution of successive stable positions in the circumferential direction is relatively small, which increases the accuracy in manually setting the exterior mirror unit.

In addition, the distance between the housing unit and the support unit remains practically the same since, generally, upon a first coupling coming into engagement, a second coupling, by contrast, decouples. As a consequence, the spring action may be configured differently. After all, the required spring action only needs to be supplied in a specific working area.

Preferably, the relative position of the coupling faces mutually in a coupling is proportionally divided over a set of couplings of the coupling unit so that a more uniform tactile resolution is obtained in manually adjusting the adjusting instrument. Moreover, the distance variation between the housing unit and the support unit then becomes still smaller with manual adjustment.

The invention also relates to a method.

Further advantageous embodiments are represented in the dependent claims.

It is noted that the above-described features and method steps can each individually be part of an adjusting instrument or method, that is, isolated from the context in which they are described, separately from other features or method steps, in combination with only some of the other features or method steps described in the context in which the adjusting instrument is disclosed. Each of the features or method steps may furthermore be combined with every other feature or method step described, in any combination.

The invention will be further elucidated on the basis of an exemplary embodiment of an adjusting instrument as shown in the drawing. In the drawing.

In the figures, like or corresponding parts are designated with the same reference numerals. It is noted that the figures are merely shown by way of exemplary embodiment and should not be construed as limiting in any way.

Figure 1:
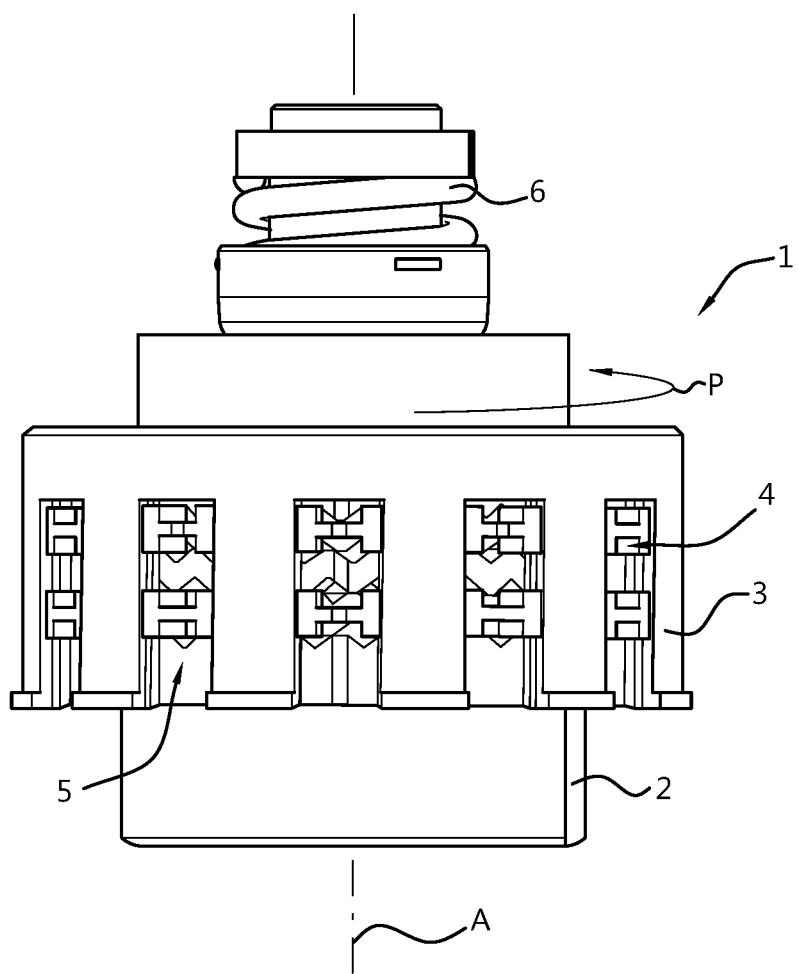
FIG. 1 shows a schematic side view of an adjusting instrument according to the invention.

FIG. 1 shows a schematic side view of an adjusting instrument 1 according to the invention. The adjusting instrument 1 is configured for carrying an exterior mirror unit of a vehicle such as a passenger car or truck. To this end, the adjusting instrument 1 includes a support unit 2 and a housing unit 3. The housing unit 3 is pivotable relative to the stationary support unit 2 about a rotation axis A in a circumferential direction P, between a plurality of positions. Thus, the housing unit can assume, for example, a park position, a drive position and an overfold position. In the park position the exterior mirror unit is directed substantially along the vehicle with a mirror side facing the vehicle. In the drive position the exterior mirror unit is directed substantially transversely to the vehicle. And in the overfold position the exterior mirror unit is directed substantially along the vehicle with the mirror side facing away from the vehicle.

The adjusting instrument 1 furthermore comprises a coupling unit 4 for coupling of the housing unit 3 to the support unit 2. The coupling unit 4 is breakably rotation-locked to allow the housing unit 3 to be pivoted when an external force is exerted on the housing, for example upon manual adjustment of the exterior mirror unit or when the exterior mirror unit hits an external object. The coupling unit 4 comprises a plural number N of parallel disposed couplings 5 which are each breakably rotation-locked. Generally, N is a natural number greater than one. In the embodiment shown, N equals four. The adjusting instrument 1 also has a spring element 6 which presses coupling faces of the couplings, described hereinafter, against each other.

The support unit 2 may be provided with a stationary base plate, for attachment to the vehicle, and a drive module electrically pivotable relative to the base plate, which is attached to the coupling unit 4 in a rotation-locked manner. Thus, the housing unit can be adjusted both manually and electrically.

Alternatively, the housing unit 3 may be provided with a housing frame and a drive module electrically pivotable relative to the housing frame, which is attached to the coupling unit 4 in a rotation-locked manner.

It is incidentally noted that the adjusting instrument, in principle, may also be provided without electrically pivotable drive module, for obtaining an exclusively manually adjustable exterior mirror unit.

Figure 2:
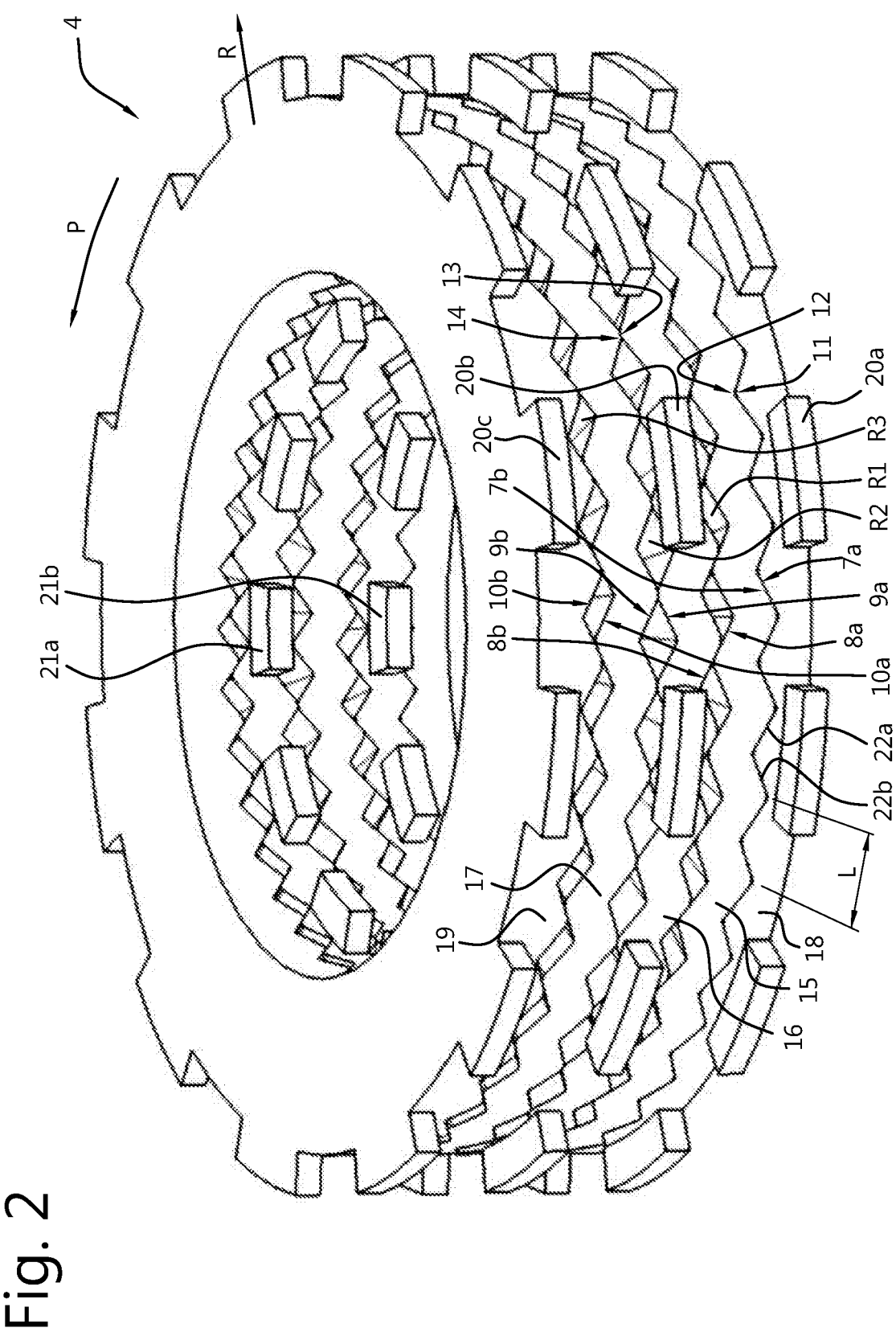
FIG. 2 shows a schematic perspective view of a coupling unit of the adjusting instrument of FIG. 1.

FIG. 2 shows a schematic perspective view of a coupling unit 4 of the adjusting instrument 1. The coupling unit 4 has four couplings 7-10, with each coupling having two mutually opposed coupling faces 7a-b, 8a-b, 9a-b, 10a-b. The coupling faces are pressed against each other by the above-mentioned spring action. Furthermore, the coupling faces 7a-b, 8a-b, 9a-b, 10a-b of the individual couplings 7-10 are mutually displaceable by a rotary movement about the rotation axis A. As shown in FIG. 2, the coupling faces 7a-b, 8a-b, 9a-b, 10a-b have a periodic cam pattern engaging in each other, so that each pair of coupling faces of a coupling is mutually breakably rotation-locked. Depending on the mutual relative position of the cam patterns of a mutually associated pair of coupling faces 7a-b, 8a-b, 9a-b, 10a-b, there is an intermediate space R1, R2, R3 between the respective coupling faces.

The coupling faces 7a-b of a first, lowermost coupling 7 fall into each other, such that a projecting cam 11 of one coupling face 7a falls into the similarly shaped recess 12 of the other coupling face 7b. The coupling faces 7a-b wholly or practically wholly abut against each other. There is no intermediate space between the coupling faces of the first, lowermost coupling 7. The coupling faces 7a, 7b are in engagement with each other. The coupling faces 8a-b of the second coupling 8 situated directly above the first coupling 7 have an intermediate space R1 because the faces 8a-b abut against each other only in part. Relative to the mutual position of the first coupling faces 7a-b, the upper coupling face 8b is slightly pivoted clockwise relative to the lower coupling face 8a of the second coupling. In the third coupling 9, which is situated directly above the second coupling 8, the upper coupling face 9b in turn is pivoted clockwise slightly further relative to the lower coupling face 9a. The cams of the cam pattern of the mutually opposed coupling faces 9a-b are now on top of each other, so that the intermediate space R2 is maximal. In the fourth, uppermost coupling 10 the upper coupling face 10b is again slightly pivoted clockwise relative to the lower coupling face 10a. As a result, the intermediate space R3 between the coupling faces 10a-b decreases again. Thus, only one of the four couplings 7-10 is in engagement at the same time.

The mutual relative positions of the coupling faces 7a-b, 8a-b, 9a-b, 10a-b of each coupling 7-10 are proportionally divided over the set of four couplings 7-10. Thus, the mutual relative position in the second coupling 8 has increased by a quarter of the length L of a cam 11 in the pattern relative to the first coupling 7. Likewise, the mutual position in the third coupling 9 has increased by a quarter of the length L of a cam 11 in the pattern relative to the second coupling 8, hence by a half of the length L of a cam 11 relative to the first coupling 7. Also the mutual position in the fourth coupling 10 has increased by a quarter of the length L of a cam 11 in the pattern relative to the third coupling 9, so in total three quarters of the length L of a cam 11 relative to the first coupling 7. The mutual relative positions of the coupling faces 7a-b, 8a-b, 9a-b, 10a-b in the couplings are thus offset per coupling 7-10 by a quarter of the cam length L in each case. Thus, the mutual relative positions are proportionally divided over the length L of a cam 11.

In the embodiment shown, the mutual relative position increases in the order of the couplings 7-10 disposed above each other. It is noted that the order may be different in alternative embodiments of the adjusting instrument 1. Thus, the mutual relative position may decrease in the order of couplings 7-10 disposed above each other, or be divided arbitrarily but evenly. The coupling positions are then, in principle, at a constant distance from each other, in the circumferential direction at equidistant positions.

In addition, the mutual relative position of the coupling faces of the individual couplings may be disproportionally divided over the set of couplings, for example more or less arbitrarily or stochastically. The distances in circumferential direction between the coupling positions are not constant then.

The mutual relative position of the mutually associated coupling faces 7a-b, 8a-b, 9a-b, 10a-b, in the circumferential direction P, defines for each coupling 7-10 a height function which describes the height, also called thickness, of the coupling. The height function is periodic, in the implementation shown with a spatial period which is equal to the length L of a cam 11 of the cam pattern, and is directly related to the intermediate spaces between the respective coupling faces 7$a$-$b$, 8$a$-$b$, 9$a$-$b$, 10$a$-$b$ of the individual couplings. The phase of the height functions of the set of four couplings is proportionally divided, hence as 0, ½Π, Π and 1½Π for the first coupling 7 to the fourth coupling 10. In another position of the coupling unit, the phase may be different, so, for example, ⅛Π, ⅝Π, 1⅛Π and 1⅝Π, though in the implementation as shown in FIG. 2 such that the individual phases of the height functions are proportionally divided.

By choosing the phase of each height function of the set of four couplings to be unique and setting it such that the phase has an elementary phase difference with respect to the phase of the height function of another coupling of the set of couplings, with the elementary phase difference being equal to a whole period divided by the number of couplings of the set of couplings, the phases are proportionally divided and the total height, also called thickness, of the couplings remains the same, independently of the mutual pivoted position of the housing unit 3 relative to the support unit 2.

In the embodiment shown, the number of couplings in the set of couplings is four, and the elementary phase difference is 2 Π/4=½Π. The set of couplings contains all couplings 7-10 of the coupling unit 4. Obviously, the set of couplings can contain more than four couplings, for example eight. The elementary phase difference is then 2 Π/8=¼Π. Also, the set of couplings could contain fewer than four couplings, for example two couplings. The elementary phase difference is then 2 Π/2=Π. In addition, the coupling unit 4 can contain a plurality of the above-described sets of couplings. The number of couplings that is in engagement at the same time is less than the total number of couplings. The number of couplings that is in engagement in a specific position of the coupling unit is then, for example, one or more, for example two. Alternatively formulated, the coupling unit comprises n mutually breakable couplings, with n≥2, where each coupling i (1<i<n) comprises two mutually facing coupling faces 1$i$ and 2$i$, where each coupling face is provided with at least one cooperating cam pair comprising a cam $A_i$ with cam flanks $A_i$-$a$ and $A_i$-$b$, arranged on one of the two coupling faces 1$i$ or 2$i$, and a recess $B_i$ with recess flanks $B_i$-$a$ and $B_i$-$b$, provided in the oppositely arranged coupling face 2$i$ or 1$i$, where each cam and recess have a maximum cooperation height h, such that in a random position j (1<j<n) of the coupling unit only one coupling face pair 1$j$-2$j$ comprises the maximum cooperation height h and all other cooperation faces have a cooperation height h'k=h–k*h/n (1<k<n) and where it holds for all cooperation faces that h'k is unique.

The coupling unit 4 in the embodiment shown comprises three coupling plates 15-17 which are rotatable in the circumferential direction P. The top and bottom faces of the coupling plates 15-17 form coupling faces as described above. The bottom face of a coupling plate 15-17 forms the upper coupling face of a particular coupling while the top face of the coupling plate forms the lower coupling face of a coupling situated above it. Thus the bottom face of the lowermost coupling plate 15 forms the upper coupling face 7$b$ of the lowermost, first coupling 7 while the top face of the lowermost coupling plate 15 forms the lower coupling face 8$a$ of the second coupling 8 located directly above the first coupling 7. By implementing both the top and bottom of the coupling plates 15-17 as coupling face, a compact whole can be obtained. Alternatively, only the top or bottom of the coupling plates 15-17 is implemented as coupling face and the other side is, for example, attached in a rotation-locked manner to the coupling plate located above it.

Furthermore, the coupling unit 4 has a base plate 18, attached in a rotation-locked manner to the support unit 2, whose top forms the lower coupling face 7$a$ of the lowermost, first coupling 7. Thus, the top of the base plate 18 and the bottom of the lowermost coupling plate 15 form the two coupling faces 7$a$-$b$ of the first coupling 7. The coupling unit also has a top plate 19, attached in a rotation-locked manner to the housing unit 3, whose bottom forms the upper coupling face 10$b$ of the uppermost, fourth coupling 10. Thus, the bottom of the top plate 19 and the top of the uppermost coupling plate 17 form the two coupling faces 10$a$-$b$ of the uppermost, fourth coupling 10. In an alternative embodiment, the base plate 18 is attached in a rotation-locked manner to the housing unit 3, while the top plate 19 is attached in a rotation-locked manner to the support unit 2.

In the embodiment shown, the base plate 18, the three coupling plates 15-17 and the top plate 19 form a stacked structure which is under spring action. In principle, the couplings can be implemented in a different, non-stacked, but parallel buildup, for example with shafts arranged between the couplings.

The coupling plates 15-17 are alternately attached in a rotation-locked manner to the support unit 2 and the housing unit 3, in turns in the stacked structure. In the embodiment shown, the coupling plates 15-17, and, for that matter, also the base plate 18 and the top plate 19, are provided with radially projecting segments, viz., radially outwardly projecting segments 20$a$-$c$ and radially inwardly projecting segments 21$a$-$b$, respectively, to be received in a rotation-locked manner in corresponding recesses of the support unit 2 and the housing unit 3, respectively. Obviously, other forms of attachment are possible, for example, a screwed connection.

In the embodiment shown, the coupling plates 15-17, as well as the base plate 18 and the top plate 19, are ring-shaped. In principle, other geometries are also applicable. For example, the coupling plates may be disc-shaped.

The cam pattern of the coupling faces 7$a$-$b$, 8$a$-$b$, 9$a$-$b$, 10$a$-$b$ is formed as a periodic tooth profile in the circumferential direction P. The teeth or cams of mutually opposed coupling faces engage into each other and slide along each other when the faces pivot mutually around the rotation axis A. In principle, however, other cam patterns are also conceivable, for example a corrugated profile.

In the embodiment shown, the cam pattern extends radially invariantly. The cams and recesses thus form a structure that is constant in the radial direction R and forms a toothing in the circumferential direction P. Alternatively, the cam pattern is configured with a varying non-constant pattern in the radial direction R, for example by using a two-dimensional cam pattern, in both the radial direction R and the circumferential direction P.

The cams are preferably configured symmetrically so that a clockwise adjustment of housing unit 3 relative to the support unit 2 yields an effect comparable with a counterclockwise adjustment. However, the cams may also be configured asymmetrically, for example with different slope angles on the right-hand and left-hand flank of the cams.

The cams in the coupling unit 4 of FIG. 2 have a run-on surface 22$a$ with a contiguous run-off surface 22$b$. However, other cam profiles are also applicable, such as a cam where the run-on surface passes into the run-off surface via an intermediate surface, with the intermediate surface extending broadly parallel to the coupling plates. It is greatly preferred for the cooperating coupling faces of a coupling to have a conforming contour so that the coupling faces can wholly engage into each other.

Figure 3A:
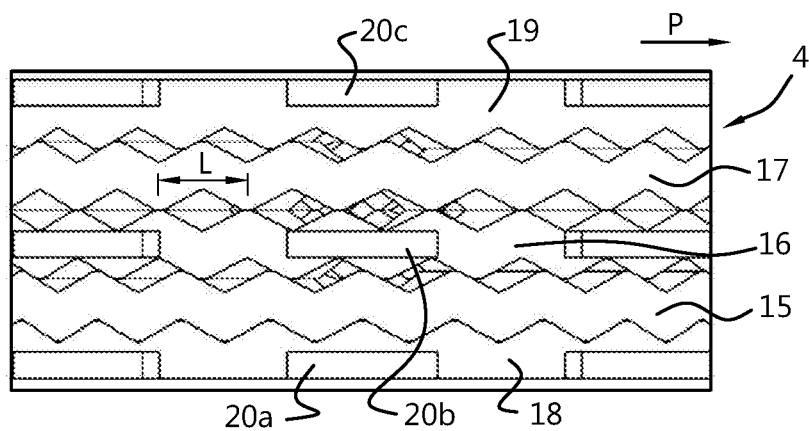
FIG. 3a shows a schematic side view of a coupling unit of FIG. 2 in a first position.
Figure 3B:
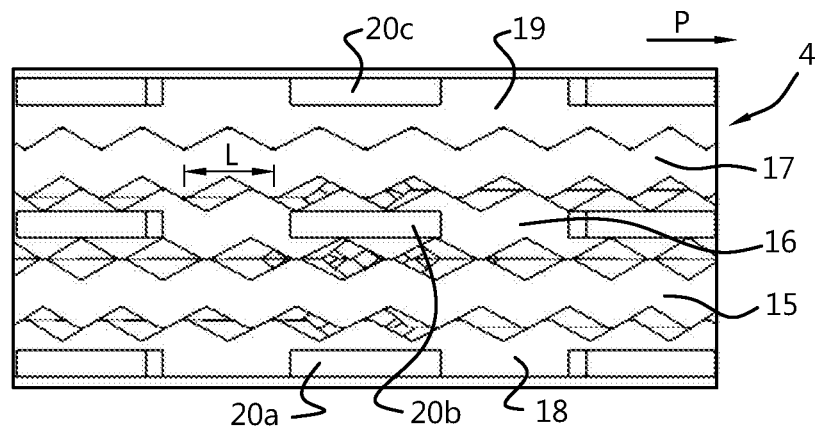
FIG. 3b shows a schematic side view of a coupling unit of FIG. 2 in a second position.
Figure 3C:
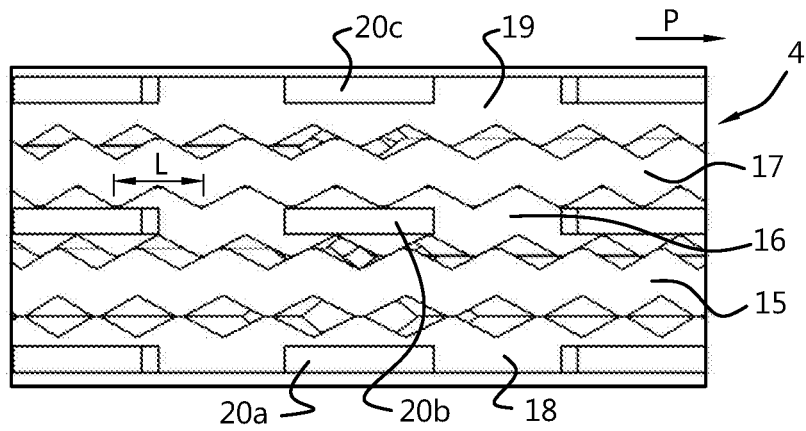
FIG. 3c shows a schematic side view of a coupling unit of FIG. 2 in a third position.
Figure 3D:
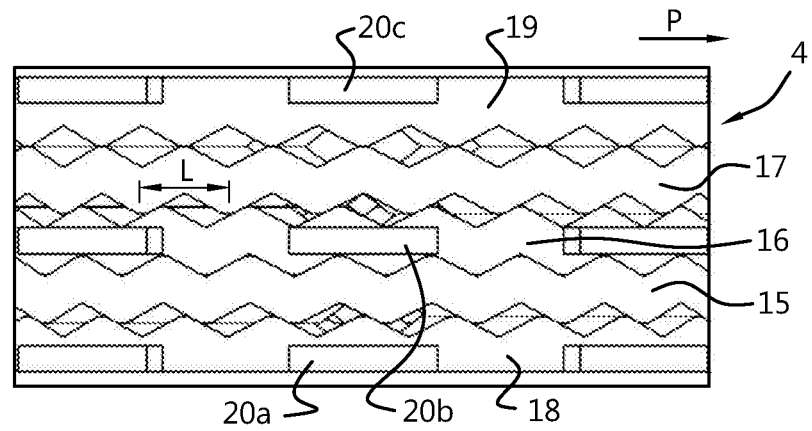
FIG. 3d shows a schematic side view of a coupling unit of FIG. 2 in a fourth position.

FIG. 3a shows a schematic side view of the coupling unit 4 in a first position which corresponds to the position as shown in FIG. 2. Further, FIG. 3b shows a schematic side view of the coupling unit 4 where the lowermost and the uppermost coupling plate 15, 17, connected to the housing unit 3, have been pivoted slightly counterclockwise, in the circumferential direction P, relative to the base plate 18, the middle coupling plate 16 and the top plate 19, connected to the support unit 2. The pivoting movement has been performed over a quarter of the cam length L in the circumferential direction P. Likewise, FIG. 3c and FIG. 3d show a schematic side view of the coupling unit 4 where the lowermost and uppermost coupling plates 15, 17 have been pivoted over another quarter of the cam length L and a half of the cam length L, respectively, relative to the base plate 18, the middle coupling plate 16 and the top plate 19.

Figure 4:
FIG. 4 shows a flow diagram of a method according to the invention.

FIG. 4 shows a flow diagram of a method according to the invention for manufacturing 100 an adjusting instrument 1 as described above. The method preferably comprises stacking onto the base plate 18 the single or plural number of coupling plates 15-17 and the top plate 19. It is greatly preferred for stacking to take place by utilizing a stationary, guiding structure which receives the radially outwardly projecting parts 20a-c and the radially inwardly projecting parts 21a-b of the base plate 18, the coupling plates 15-17 and/or the top plate 19.

Figure 5A:
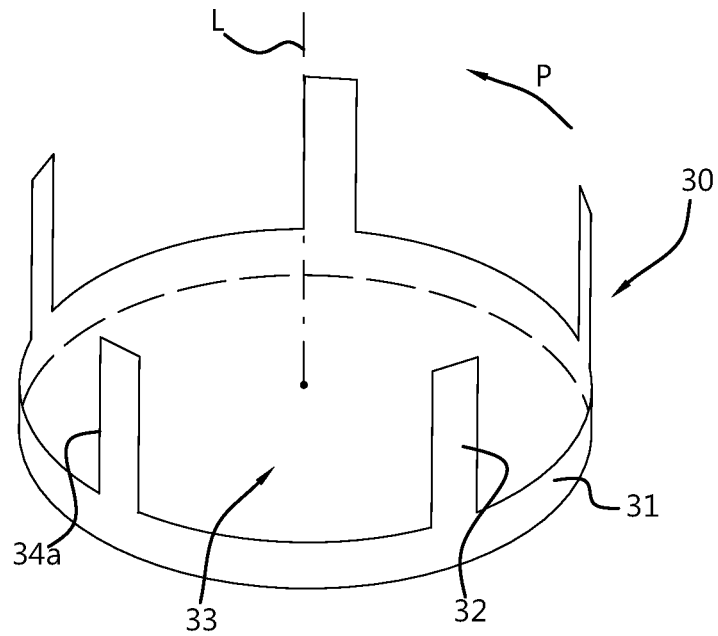
FIG. 5a shows a schematic perspective view of a guiding structure which can be used in the method of FIG. 4.

FIG. 5a shows a schematic perspective view of a guiding structure 30 which can be used in stacking the coupling plates 15-17 and the top plate 19. The guiding structure 30 comprises a ring-shaped module 31 which is provided with axially extending fingers 32, substantially parallel to the axis L of the ring-shaped module 31. The intermediate space 33 between successive fingers 32 can, during stacking, receive the radially outwardly projecting parts 20a-c. A similar guiding structure can be used for receiving the radially inwardly projecting parts 21a-b. By locking the radially projecting parts 20a-c, 21a-b in the circumferential direction P, the relative, mutual position of the base plate 18, the coupling plates 15-17 and/or the top plate 19 can be set.

Figure 5B:
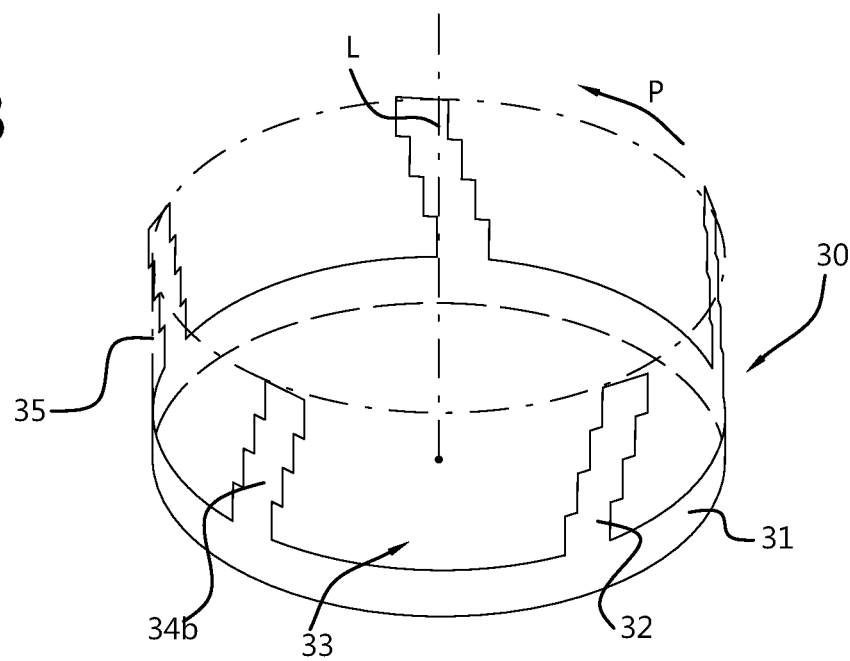
FIG. 5b shows a schematic perspective view of another guiding structure that can be used in the method of FIG. 4.

In the guiding structure 30 as shown in FIG. 5a, the fingers 32 and the intermediate space 33 extend substantially parallel relative to the axis L of the ring-shaped module 31. FIG. 5b shows a schematic perspective view of another guiding structure 30, where the fingers 32 are oriented differently, viz., at an angle to the axis L of the ring module 31, though in an imaginary cylinder 35 in which also the ring module 31 is situated and whose axes L coincide. By oblique placement of the fingers 32, the intermediate space 33 also has oblique edges so that the location of radially projecting cams of stacked plates can stagger in the circumferential direction P. Furthermore, the fingers 32 can have a straight profile 34a, as shown in FIG. 5a, or a different profile, for example, a stepped contour 34b as shown in FIG. 5b. In addition, the guiding structure 30 can be a separate module which, for example, may be used repeatedly for manufacturing a series of adjusting instruments, or the guiding structure 30 can be part of the adjusting instrument 1 itself. Thus, the guiding structure 30 can be part of the housing unit 30 as shown in FIG. 1.

Also, the coupling plates 15-17 and the top plate 19 may, in principle, be built up differently, without the aid of a stationary, guiding structure, for example via optical inspection.

It is greatly preferred for the coupling plates 15-17 of a coupling unit to be marked differently from each other, for example with different colors and/or by unique design, in order to prevent the coupling plates being stacked in an incorrect order.

The invention is not limited to the exemplary embodiments represented here. For example, the spring may be designed differently, as two separate elastic elements. Also, functions that are performed by the spring in this exemplary embodiment may be carried out differently, for example with a hard stop or a smaller tolerance between the different parts of the adjusting instrument, or be omitted.

Furthermore, the couplings may include a resilient material provided between the coupling faces, such as a rubber ring, to reduce or even eliminate altogether a rattling, ticking or other auditory phenomenon in manual adjustment of the adjusting instrument.

In principle, the couplings in the coupling unit may be set up serially, instead of parallel as described above. Also, embodiments are possible where the couplings are set up partly serially, partly parallel.

It is noted that the principle of the coupling unit is applicable not only for breakable rotation locking, but also for breakable locking in a different direction, for example a linear direction. Thus, a breakable linear locking, for example in a linear or translating actuator, can be obtained. Also, the principle may be applied in more than one dimension, for example in an actuator which has degrees of freedom in two dimensions such as a bowl-shaped actuator.

Many variants are possible and will be clear to the skilled person within the scope of the appended claims.

For the purpose of a clear and concise description, the features have been described as part of the same or separate embodiments. However, the scope of protection can include embodiments with combinations of any or all of the features described.

The invention claimed is:

1. An adjusting instrument for an exterior mirror unit of a vehicle, comprising:
   a support unit;
   a housing unit pivotable in a circumferential direction between a plurality of positions relative to the support unit; and
   a breakable rotation-locked coupling unit for coupling the housing unit to the support unit, comprising a base plate having a top, a top plate having a bottom, and one or more coupling plates located between the base plate and the top plate, each coupling plate having a top face and a bottom face and rotatable in the circumferential direction, wherein
   couplings are formed between the base plate and the at least one or more coupling plates, the top plate and the at least one or more coupling plates, and the coupling plates themselves when more than one coupling plate is present,
   the base plate is attached in a rotation-locked manner to the housing unit or support unit, such that the top of the base plate together with the bottom face of a lowermost coupling plate of the at least one or more coupling plates forms a lowermost coupling,
   the top plate is attached in a rotation-locked manner to the other of the support unit or the housing unit, such that the bottom of the top plate together with the top face of an uppermost coupling plate of the at least one or more coupling plates forms an uppermost coupling,
   each coupling is, pressed against each other under spring action that are mutually opposed, mutually displaceable in the circumferential direction, and are provided with a periodic cam pattern engaging in each other, the two coupling faces are mutually breakably rotation-locked, the couplings are disposed in parallel, a number N of the couplings is plural, and a limited number M of the parallel disposed couplings is in engagement at the same time, with M being less than N.

2. The adjusting instrument according to claim 1, wherein a phase of each height function differs between each coupling of the coupling unit.

3. The adjusting instrument according to claim 2, wherein the relative position of the two coupling faces mutually in the coupling is proportionally divided over the set of couplings of the coupling unit.

4. The adjusting instrument according to claim 2, wherein the set of couplings contains all the couplings of the coupling unit.

5. The adjusting instrument according to claim 2, wherein the coupling unit comprises a plurality of sets of couplings.

6. The adjusting instrument according to claim 1, wherein the top face and the bottom face of a coupling plate form coupling faces of two successive couplings.

7. The adjusting instrument according to claim 1, wherein the base plate, the at least one or more coupling plates, and the top plate form a stacked structure which is under spring action.

8. The adjusting instrument according to claim 1, wherein the at least one or more coupling plates are alternately attached in a rotation-locked manner to the support unit and the housing unit.

9. The adjusting instrument according to claim 1, wherein the support unit is provided with a base plate that is stationary and a drive module, electrically pivotable relative to the base plate, which is attached in a rotation-locked manner to the coupling unit.

10. The adjusting instrument according to claim 1, wherein the housing unit is provided with a housing frame and a driving module, electrically pivotable relative to the housing frame, which is attached in a rotation-locked manner to the coupling unit.

11. The adjusting instrument according to claim 1, wherein the periodic cam pattern is formed as a tooth profile in the circumferential direction.

12. The adjusting instrument according to claim 1, wherein the periodic cam pattern extends radially invariantly.

13. The adjusting instrument according to claim 1, wherein the periodic cams are configured symmetrically.

14. The adjusting instrument according to claim 1, wherein the periodic cams have a run-on surface and a contiguous run-down surface.

15. The adjusting instrument according to claim 2, wherein the coupling faces of a coupling mutually have a relative position in the circumferential direction which defines a periodic height function whose phase is proportionally divided over the set of couplings of the coupling unit.

16. The adjusting instrument according to claim 15, wherein the phase of the periodic height function of each of the couplings of the set of couplings is unique and has an elementary phase difference with respect to the height function phase of another coupling of the set of couplings, and wherein the elementary phase difference is equal to a whole period divided by the number of couplings of the set of couplings.

17. A method for manufacturing an adjusting instrument for an exterior mirror unit of a vehicle according to claim 1, comprising
stacking the at least one or more coupling plates and the top plate onto the base plate.

18. The method according to claim 17, further comprising guiding at least one of the base plate, the at least one or more coupling plates, or the top plate via a stationary guiding structure which receives a radially projecting part, wherein
the radially projecting part projects radially inward or radially outward from at least one of the base plate, the at least one or more coupling plates, or the top plate.

19. The method according to claim 17, wherein the at least one or more coupling plates of a coupling unit are marked differently from each other.

20. The method according to claim 17, further comprising guiding at least one of the base plate, the at least one or more coupling plates, or the top plate via optical inspection of an angular position of a radially projecting part, wherein
the radially projecting part projects radially inward or radially outward from at least one of the base plate, the at least one or more coupling plates, or the top plate.

21. The adjusting instrument according to claim 1, wherein intermediate spaces exist between the top faces and the bottom faces of adjacent coupling plates.

22. The method according to claim 18, further comprising a guiding structure for guiding the at least one of the base plate, the at least one or more coupling plates, or the top plate, wherein the guiding structure comprises a ring-shaped module provided with axially extending fingers substantially parallel to the axis L of the ring-shaped module.

* * * * *